United States Patent
Lower et al.

(10) Patent No.: US 9,246,183 B1
(45) Date of Patent: Jan. 26, 2016

(54) METHODS AND MATERIALS FOR USE WITH FUEL CELLS

(71) Applicants: Nathan P. Lower, North Liberty, IA (US); Ross Wilcoxon, Cedar Rapids, IA (US); David W. Cripe, Mount Vernon, IA (US); Luke R. Porisch, Robins, IA (US)

(72) Inventors: Nathan P. Lower, North Liberty, IA (US); Ross Wilcoxon, Cedar Rapids, IA (US); David W. Cripe, Mount Vernon, IA (US); Luke R. Porisch, Robins, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 106 days.

(21) Appl. No.: 14/070,299

(22) Filed: Nov. 1, 2013

Related U.S. Application Data

(63) Continuation of application No. 13/238,980, filed on Sep. 21, 2011, now abandoned.

(51) Int. Cl.
*H01M 8/06* (2006.01)
*C01B 3/10* (2006.01)
*F23C 99/00* (2006.01)

(52) U.S. Cl.
CPC ............ *H01M 8/065* (2013.01); *C01B 3/10* (2013.01); *F23C 99/00* (2013.01)

(58) Field of Classification Search
CPC ........................................... H01M 8/065
See application file for complete search history.

(56) References Cited

U.S. PATENT DOCUMENTS

2012/0052001 A1  3/2012  Woodall et al.

OTHER PUBLICATIONS

Fuel Cell Technologies Program—Comparison of Fuel Cell Technologies, available at website: http://www1.eere.energy.gov/hydrogenandfuelcells/fuelcells/pdfs/ fc_comparison_chart.pdf, Mar. 9, 2011, 1 page.
Information regarding Fuel Cells obtained from Wikipedia, available at website: http://en.wikipedia.org/wiki/Fuel_Cell, dated Sep. 7, 2011, 29 pages.
Venere, E., New process generates hydrogen from aluminum alloy to run engines, fuel cells, Purdue University, May 15, 2007, 5 pages, available at website: http://www.purdue.edu/uns/x/2007a/070515WoodallHydrogen.html.
Office Action for U.S. Appl. No. 13/238,980, mail date Mar. 13, 2013, 7 pages.
Office Action for U.S. Appl. No. 13/238,980, mail date Aug. 14, 2013, 4 pages.

*Primary Examiner* — Jane Rhee
(74) *Attorney, Agent, or Firm* — Angel Gerdzhikov; Donna Suchy; Daniel Barbieri

(57) ABSTRACT

A composition of matter is configured for use as at least a part of an energy source when combined with water. The composition of matter includes a metal comprising gallium and aluminum that is alloyed with the metal. The metal comprising gallium is liquid at a room temperature of 70° F. and at a standard atmospheric pressure of 14.7 psi.

16 Claims, 1 Drawing Sheet

METHODS AND MATERIALS FOR USE WITH FUEL CELLS

CROSS-REFERENCE TO RELATED PATENT APPLICATIONS

This application is a continuation of U.S. application Ser. No. 13/238,980, filed Sep. 21, 2011, incorporated herein by reference in its entirety.

BACKGROUND

The present invention generally relates to an alloy that may be combined with water to produce hydrogen gas for energy purposes, as well as methods of producing and using the same.

Aluminum chemically reacts with water to produce hydrogen, among other byproducts, which may be a potential source of fuel. Hydrogen gas can be combusted in an engine to provide mechanical power and can be combined with oxygen in a fuel cell to produce electricity. However, corrosion of the aluminum during the reaction typically results in the formation of an oxidized exterior layer that seals the interior aluminum, limiting continued corrosion and generation of hydrogen. To overcome this oxidation phenomena, researchers have found that aluminum may be alloyed with (i.e., combined with, mixed with, coupled to) gallium to provide an aluminum alloy that still reacts with water to produce hydrogen but does not form an impermeable oxidized exterior coating. As such, contact of the alloy with water as well as moisture in the air facilitates the chemical reaction that produces hydrogen. With sufficient water, the process may continue until virtually the entire quantity of aluminum is consumed.

While presently gallium is considerably more expensive than aluminum, the gallium component of the aluminum alloy does not react with water in the above process and is not consumed. Instead, in addition to hydrogen, byproducts from the reaction include gallium and alumina. The gallium can then be separated from the alumina and alloyed again with new aluminum for continued use when the previous aluminum has been fully consumed. Drawbacks of the above process for using aluminum-gallium alloy as a source of hydrogen include the energy costs and difficulty associated with efficiently alloying the aluminum with gallium, as well as the energy costs and difficulty associated with efficiently separating the gallium from the alumina so that the gallium may be recycled and used with the new aluminum.

A need exists for a composition of matter and corresponding processes of making and using the composition of matter that allow for efficient use of aluminum alloyed with gallium to produce hydrogen from water for energy purposes. The gallium should be efficiently combined with aluminum and efficiently separated from aluminum oxide for reuse.

SUMMARY

One embodiment of the invention relates to a composition of matter configured for use as at least part of an energy source when combined with water. The composition of matter includes a metal and aluminum alloyed with the metal. The metal includes gallium and is liquid at a room temperature of 70° F. and at a standard atmospheric pressure of 14.7 psi.

Another embodiment of the invention relates to a composition of matter, which includes a metal and aluminum alloyed with the metal. The metal includes gallium and at least one of indium and tin.

Yet another embodiment of the invention relates to a method of using a composition of matter. The method includes a step of producing hydrogen by introducing water to a composition of matter, which includes a metal and aluminum alloyed with the metal. The metal includes gallium and at least one of indium and tin. The method further includes using the hydrogen as an energy source.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 2:
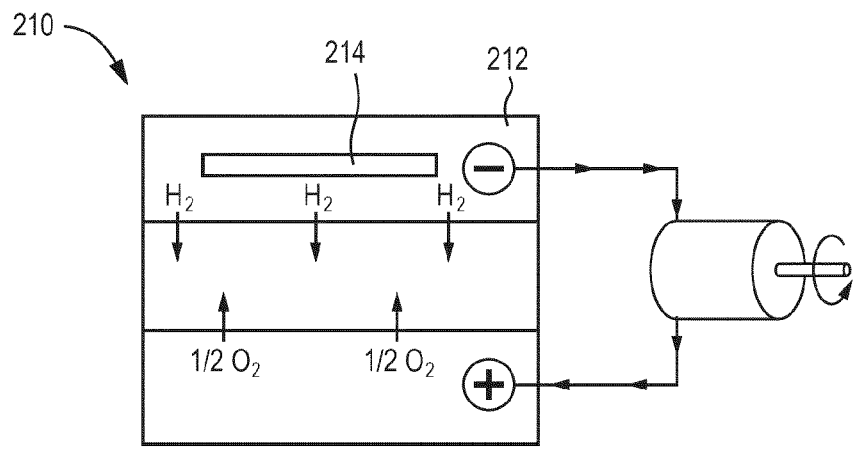
FIG. 2 is a schematic diagram of a fuel cell according to an exemplary embodiment of the invention.
Figure 3:
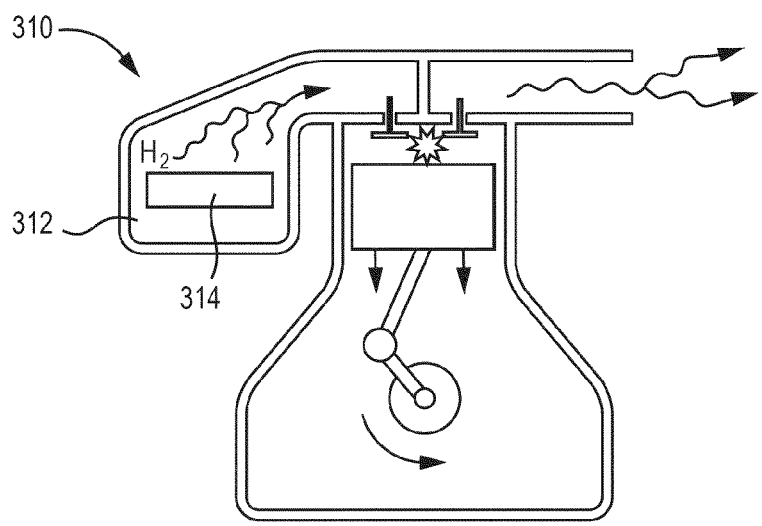
FIG. 3 is a schematic diagram of an engine according to an exemplary embodiment of the invention.

A source of high energy-density solid fuel that releases hydrogen gas upon exposure to water (e.g., moisture or humidity) may be used as at least part of a source of energy. In some embodiments, the hydrogen gas can be directly converted to electrical energy by combination with oxygen a fuel cell (see generally fuel cell 210 as shown in FIG. 2). In other embodiments, the hydrogen gas may be combusted in an engine (see generally engine 310 as shown in FIG. 3). According to an exemplary embodiment, the high energy-density solid fuel is an aluminum that has been alloyed with a gallium-containing metal (e.g., material, gallium alloy).

In general, combining aluminum with the gallium-containing metal forms a reactive aluminum alloy (e.g., galvanic cell) that reacts with water at room temperature to convert the aluminum to aluminum oxide (i.e., $Al_2O_3$; alumina) and aluminum hydroxide (i.e., $Al(OH)_3$; ATH), and in turn generates hydrogen gas in the process. According to an exemplary embodiment, the gallium-containing metal has a relatively low melting temperature and additionally contains at least one of indium and tin. The melting temperature of the gallium-containing metal is substantially less than that of gallium alone (e.g., at least 10° F. less, at least 50° F. less), where the melting temperature of gallium is about 85° F.

In some embodiments, the gallium-containing metal alloyed with aluminum includes (e.g., comprises, consists essentially of, consists of) gallium, indium, and/or tin. In some such embodiments, the composition includes about 70% gallium by mass, about 20% indium, and about 10% tin, such as commercially-available GALISTAN manufactured by Geratherm Medical AG, which Applicants believe to consist essentially of 68.5% gallium, 21.5% indium, 10% tin with insubstantial amounts of copper. In other embodiments, the composition includes binaries of gallium, ternaries of gallium, quaternaries of gallium (e.g., gallium, indium, tin, and bismuth), and other gallium-containing metals. According to an exemplary embodiment, the gallium-containing metal is in liquid phase at room temperature (e.g., about 70° F., 50 to 90° F.) and at standard atmospheric pressure (about 14.7 psi, 12 to 15 psi), in contrast to aluminum. Ternary gallium-containing metals are preferred in some embodiments because the ternaries are believed to lower the melting temperature below 50° F. For example, GALISTAN is believed to melt at temperatures at or below about −2° F. and is therefore liquid at room temperature. However, some binary and other gallium-containing metals may also have a sufficiently low melting temperature to be liquid at room temperature.

Figure 1:
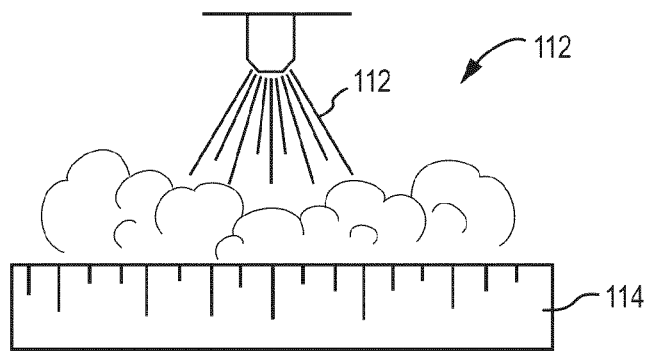
FIG. 1 is schematic diagram of aluminum being coated with a metal to form an alloy according to an exemplary embodiment of the invention.

Referring generally to FIG. 1, an aluminum alloy 110 may be formed when a liquid gallium-containing metal 112 is applied to aluminum 114. Because the gallium-containing metal 112 is liquid at room temperature, the gallium-containing metal 112 may be applied to the aluminum 114 in a variety of less-intensive application techniques at room temperature, including spraying (see generally FIG. 1), painting, or other deposition techniques. Accordingly, use of the gallium-containing metal 112, which is in liquid form at room temperature, may greatly improve the efficiency of alloying the aluminum 114 with gallium. Furthermore, the diffusion of the gallium-containing metal 112 into aluminum 114 is expected to be much faster than would be the diffusion of gallium alone, as Applicants believe the rate of gallium diffusion generally corresponds with melting temperature. As such, use of the gallium-containing metal 112 allows for the formation of the solid fuel source at temperatures as low as room temp (in moisture free environment) or possibly lower, thus not requiring additional heat energy to create the aluminum-gallium alloy. Alternatively, the aluminum-gallium alloy can be more quickly formed (on the order of minutes to hours) at elevated temperatures (e.g., greater than 212° F.), in environments where the reactivity of water is too low to consume the gallium-containing metal.

The geometry of the aluminum and/or resulting aluminum alloy (e.g., aluminum-gallium alloy, aluminum-GALISTAN alloy, aluminum-mercury alloy) may vary in different embodiments. Geometry may be used to at least partially control the rate at which the aluminum alloy provides hydrogen. In some contemplated embodiments, the aluminum alloy is formed in long thin strips that have relatively high ratios of surface area to volume. Accordingly, when introduced to water, the long thin strips quickly produce hydrogen and expend the aluminum. In other contemplated embodiments, the aluminum alloy is formed in bars, rods, spheres, powder, or other geometries.

During use of the "galvanic cell" created by the aluminum combined with the liquid gallium-containing metal, it is Applicants' understanding that preferential corrosion of the aluminum (anodic metal) occurs as well as corrosion protection of the liquid gallium-containing metal component (cathodic metal). As a result, the liquid gallium-containing metal does not react or corrode during the reaction of the aluminum-gallium alloy with water.

In testing, Applicants have observed that after a complete reaction of the aluminum-gallium alloy with water, the liquid gallium-containing metal is present and unharmed within the waste byproduct powder. Under magnification Applicants found the liquid gallium-containing metal to be in microsphere form within the aluminum oxide/hydroxide waste powder.

To recover and recycle the liquid gallium-containing metal, the liquid gallium-containing metal can be recombined into a single sphere by adding the waste powder to deionized water and subjecting the powder to low-power ultrasonic energy (e.g., ultrasonic cleaner operating between 20-400 kHz). Subjecting the powder to low-power ultrasonic energy causes the microspheres to recombine into a single large sphere of liquid metal. Because the liquid metal is generally insoluble in water, the water has little to no impact on the alloy itself. Furthermore, Applicants have found that the aluminum oxide/hydroxide components of the waste powder, separated from the liquid metal, are too low in density to contaminate the liquid metal pool. The recovery and recycling process is possible using a conventional ultrasonic cleaner at least in part because the gallium-containing metal is liquid at room temperature. No additional heat energy is required for extraction, which adds to the efficiency of the technique for recycling the gallium-containing metal.

In some embodiments, the cost of the liquid metal component (e.g., GALISTAN) is roughly 2000 times the cost of aluminum. As such, the ability to extract the liquid metal for reuse has a significant impact to the overall cost of the aluminum alloy as a fuel source. Under present market pricing, if the liquid metal component is not extracted, the cost of the aluminum alloy as a solid fuel source would increase considerably.

Very little of the gallium-containing metal may be needed to initiate or sustain the reaction. Applicants have observed that when a small quantity of liquid gallium-containing metal (e.g., metal consisting of 68.5% gallium, 21.5% indium, 10% tin) is applied to aluminum, the gallium-containing metal quickly diffuses into the material and weakens the aluminum oxide that naturally forms on the surface when exposed to oxygen (referred to as "gallium poisoning of aluminum"). More particularly, the liquid metal diffuses into grain boundaries and remains in liquid state throughout the reaction. The weaker aluminum oxide is mechanically unstable and the surface does not form a continuous passivation layer normally formed on aluminum. Thus, the aluminum that has been modified with the addition of the gallium-containing metal will continuously consume oxygen until all the aluminum in the alloy has been converted to aluminum oxide or aluminum hydroxide. The time for completion of the reaction may vary as a function of the geometry of the aluminum, the quantity of gallium, the dispersal of the gallium on the aluminum, the ambient temperature, and other factors, and may be, for example, on the order of minutes to hours.

Applicants believe that fuel cells using compositions of matter disclosed herein could be a viable or even preferred alternative when compared to lead acid batteries on a per weight basis. According to one calculation corresponding to a hypothetical embodiment, a fuel cell using aluminum alloyed with gallium-containing metal disclosed herein would compare considerably better than lead acid batteries with regard to cost per unit energy as well as energy density. For purposes of context, Applicants assume the hypothetical fuel cell to be 50% efficient, to include 1 kg of water and 1 kg of aluminum, and to produce roughly 7.75 MJ of electricity with an energy density of 3.875 MJ/kg. While a single 1.5 V AA-battery weighs about 25 g and has a corresponding energy density of about 0.45 MJ/kg. Assuming that the AA-battery costs about $0.75, the cost is roughly $66/MJ for the battery. However, the cost per unit of energy of the hypothetical fuel cell would be roughly $0.28/MJ when aluminum is $1/lb, assuming that the costs of water and the small amount of gallium-containing metal lost are negligible. Thus, according to this calculation, embodiments of the hypothetical fuel cell using a composition of matter disclosed herein would result in cost savings of over 200 times the cost for comparable power from lead acid batteries, with an eightfold increase in energy density. Additionally, in some contemplated embodiments, water vapor from ambient air could be used instead of a separate volume of water stored in the hypothetical fuel cell, which would then increase the effective energy density of the hypothetical fuel cell by a factor of two. According to a similar analysis, the hypothetical fuel source as a replacement for alkaline batteries yields an eighteen fold increase in energy density by weight and a twenty-three fold reduction in cost by weight.

In contemplated aluminum alloy embodiments, mercury and alloys of mercury that are liquid at room temperature may be used in place of gallium-containing metals to facilitate continued oxidation of aluminum without the formation of an impermeable oxidized capping layers. However, a gallium-based liquid metal is preferred because the reacted byproduct material (aluminum oxide and aluminum hydroxide in powder form) are environmentally safe. As such, in addition to having a high energy density and low cost per unit of energy compared to state-of-the-art battery technologies, the aluminum-gallium alloy (e.g., including gallium, indium, and/or tin) is believed to be completely environmentally safe.

In general, Applicants believe that the aluminum alloyed with gallium-containing metal reacts relatively slowly and is thus non-explosive, and that the reaction generates a manageable amount of heat. However, Applicants also believe that the reaction rate of the aluminum alloy may be controlled by controlling the rate of moisture ingress into a chamber 212, 312 containing the aluminum alloy 214, 314, which may be accomplished by using a controlled water injection mechanism, water vapor permeable membrane, etc. located in a fuel tank of a combustion engine 310 (FIG. 3) or integrated with a fuel cell 210 (FIG. 2). The reaction rate could be further controlled to by providing a barrier that is removed only when the hydrogen fuel is required, thus providing a backup or emergency hydrogen supply for fuel cells used in critical or single-use applications. In some contemplated embodiments, the gallium-containing metal and the aluminum may be combined in the fuel tank of the engine or fuel cell.

The construction, arrangements, and uses of the aluminum alloy, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method of making a composition, comprising:
   depositing a liquid metal material onto solid aluminum, wherein the liquid metal material comprises gallium;
   alloying the liquid metal material and solid aluminum to form the composition,
   wherein the depositing and the alloying are conducted at a room temperature of 70° C. or below;
   forming aluminum oxide from a reaction of water and the composition; and
   separating the formed aluminum oxide from the liquid metal material,
   wherein the separating step further comprises subjecting the liquid metal material and the formed aluminum oxide to ultrasonic energy.

2. The method of claim 1, wherein the liquid metal material is liquid at the freezing point of water.

3. The method of claim 1, wherein the liquid metal material further comprises at least one of indium and tin.

4. The method of claim 1, wherein the liquid metal material further comprises indium and tin and, in terms of mass, comprises more indium than tin.

5. The method of claim 1, wherein the liquid metal material consists essentially of gallium, indium, and tin.

6. The method of claim 1, wherein the liquid metal material consists essentially of about 70% gallium, about 20% indium, and about 10% tin.

7. The method of claim 1, wherein the liquid metal material consists essentially of 68.5% gallium, 21.5% indium, and 10% tin.

8. The method of claim 1, wherein the depositing comprises at least one of spraying and painting.

9. The method of claim 1, wherein the alloying comprising diffusing the liquid metal material into the solid aluminum to form the composition.

10. The method of claim 1, further comprising:
    producing hydrogen by introducing water to the composition; and
    using the hydrogen as at least part of an energy source.

11. The method of claim 10, wherein the using further comprises combusting the hydrogen in an engine.

12. The method of claim 10, wherein the using further comprises combining the hydrogen with oxygen in a fuel cell to provide an electrical current.

13. The method of claim 1, further comprising, after the separating, additionally alloying the separated liquid metal material with additional aluminum.

14. The method of claim 13, wherein the additionally alloying further comprises depositing the liquid metal material onto a surface of the additional aluminum.

15. The method of claim 1, wherein composition is a part of a fuel cell.

16. The method of claim 1, wherein the liquid metal material further comprises indium and tin.

\* \* \* \* \*